(12) United States Patent
Shibata et al.

(10) Patent No.: US 7,657,538 B2
(45) Date of Patent: Feb. 2, 2010

(54) SERVER APPARATUS, DATA PROCESSING METHOD, PROGRAM, AND COMMUNICATION METHOD

(75) Inventors: Yoshiaki Shibata, Kanagawa (JP); Takayoshi Kawamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 175 days.

(21) Appl. No.: 11/549,304

(22) Filed: Oct. 13, 2006

(65) Prior Publication Data

US 2007/0130161 A1 Jun. 7, 2007

(30) Foreign Application Priority Data

Oct. 27, 2005 (JP) ............................. 2005-313126

(51) Int. Cl.
*G06F 17/30* (2006.01)
(52) U.S. Cl. .............................. 707/10; 707/1; 707/100
(58) Field of Classification Search ........................ None
See application file for complete search history.

(56) References Cited

U.S. PATENT DOCUMENTS

2003/0018974 A1 * 1/2003 Suga ........................... 725/86

2008/0022210 A1 * 1/2008 Izumino et al. ............. 715/731

FOREIGN PATENT DOCUMENTS

| JP | 10-21131 | 1/1998 |
|---|---|---|
| JP | 11-3307 | 1/1999 |
| JP | 2005-157893 | 6/2005 |

* cited by examiner

*Primary Examiner*—Baoquoc N To
(74) *Attorney, Agent, or Firm*—Oblon, Spivak, McClelland, Maier & Neustadt, L.L.P.

(57) ABSTRACT

A server apparatus for providing content data includes a generator configured to generate second management data based on first management data, the first management data managing first identification data for identifying the content data locally within the server apparatus, the second management data managing second identification data for identifying the content data globally outside the server apparatus, and an output unit configured to output the second management data generated by the generator to an external apparatus that uses the content data.

10 Claims, 13 Drawing Sheets

FIG. 3

[IndexFile] IND

```
<?xml version="1.0" encoding="UTF-8"?>
<indexFile xmlns="urn:schemas-professionalDisc:index:ver.1.00"
 proavId="48E20300333405C1F805080046020118">
<clipTable path="/PROAV/CLPR">
```
— B1

```
<clip clipId="C0001"
 umid="0D431300000038E30300333405970800046020118F805"
 file="C0001C01.SMI" fps="59.94i" dur="399" ch="8" aspectRatio="4:3"
 playable="true">
```
— C1

```
<video umid="06431300000038E30300333405970800046020118F805"
 file="C0001V01.MXF" type="IMX50" header="65536"
 clipBegin="0"/>
```
— C2

```
    <audio
 umid="08431300000038E30300333405970800046020118F805"
 file="C0001A01.MXF" type="LPCM16" header="65536"
 trackDst="CH1"/>
```
— C3

```
    <audio
 umid="0843130000003AE30300333405970800046020118F80"
 file="C0001A02.MXF" type="LPCM16" header="65536"
 trackDst="CH2"/>
```
— C4

```
    <audio
 umid="0843130000003CE30300333405970800046020118F80"
 file="C0001A03.MXF" type="LPCM16" header="65536"
 trackDst="CH3"/>
```
— C5

```
    <audio
 umid="0843130000003EE30300333405970800046020118F80"
 file="C0001A04.MXF" type="LPCM16" header="65536"
 trackDst="CH4"/>
```
— C6

```
    <audio
 umid="08431300000040E30300333405970800046020118F805"
 file="C0001A05.MXF" type="LPCM16" header="65536"
 trackDst="CH5"/>
```
— C7

```
    <audio
 umid="08431300000042E30300333405970800046020118F805"
 file="C0001A06.MXF" type="LPCM16" header="65536"
 trackDst="CH6"/>
```
— C8

```
    <audio
 umid="08431300000044E30300333405970800046020118F805"
 file="C0001A07.MXF" type="LPCM16" header="65536"
 trackDst="CH7"/>
```
— C9

```
    <audio
 umid="08431300000046E30300333405970800046020118F805"
 file="C0001A08.MXF" type="LPCM16" header="65536"
 trackDst="CH8"/>
```
— C10

```
    <subStream
 umid="0D4313FF000038E30300333405970800046020118F85"
 file="C0001S01.MXF" type="PD-SubStream" header="65536"
 clipBegin="0"/>
        <meta file="C0001M01.XML" type="PD-Meta"/>
        <rtmeta file="C0001R01.BIM" type="basic" header="65536"/>
</clip>
```
— C11

IND

```
<clip clipId="C0002"
umid="0D431300000036E50300333405970800460201 18F805"
file="C0002C01.SMI" fps="59.94i" dur="298" ch="8" aspectRatio="4:3"
referer="E0001" playable="true">
        <video
umid="0643 1300000036E50300333405970800460201 18F805"
file="C0002V01.MXF" type="IMX50" header="65536"
clipBegin="0"/>
        <audio
umid="0843 1300000036E50300333405970800460201 18F805"
file="C0002A01.MXF" type="LPCM16" header="65536"
trackDst="CH1"/>
        <audio
umid="0843 1300000038E50300333405970800460201 18F805"
file="C0002A02.MXF" type="LPCM16" header="65536"
trackDst="CH2"/>
        <audio
umid="084313000003AE50300333405970800460201 18F80"
file="C0002A03.MXF" type="NonLPCM16" header="65536"
trackDst="CH3"/>
        <audio
umid="084313000003CE50300333405970800460201 18F80"
file="C0002A04.MXF" type="NonLPCM16" header="65536"
trackDst="CH4"/>
        <audio
umid="084313000003EE50300333405970800460201 18F80"
file="C0002A05.MXF" type="LPCM16" header="65536"
trackDst="CH5"/>
        <audio
umid="0843 1300000040E50300333405970800460201 18F805"
file="C0002A06.MXF" type="LPCM16" header="65536"
trackDst="CH6"/>
        <audio
umid="0843 1300000042E50300333405970800460201 18F805"
file="C0002A07.MXF" type="LPCM16" header="65536"
trackDst="CH7"/>
        <audio
umid="0843 1300000044E50300333405970800460201 18F805"
file="C0002A08.MXF" type="LPCM16" header="65536"
trackDst="CH8"/>
        <subStream
umid="0D4313FF000036E50300333405970800460201 18F85"
file="C0002S01.MXF" type="PD-SubStream" header="65536"
clipBegin="0"/>
            <meta file="C0002M01.XML" type="PD-Meta"/>
            <rtmeta file="C0002R01.BIM" type="basic" header="65536"/>
</clip>
</clipTable>
```

IND

```
<editlistTable path="/PROAV/EDTR">
<editlist editlistId="E0001"
umid="0D43130000005EE80300333405970800460201 1
8F805"
file="E0001E01.SMI" dur="298" fps="59.94i" ch="8"
aspectRatio="4:3"
videoCodec="IMX50">
<meta file="E0001M01.XML" type="PD-Meta"/>
</editlist>
</editlistTable>
</indexFile>
```

[MediaProfile]  MP

```
<?xml version="1.0" encoding="UTF-8"?>
<MediaProfile xmlns="http://xmlns.sony.com/pro/metadata/mediaprofile"
createdAt="2005-01-31T23:45:34+09:00" version="1.00">
```
~ B11

```
<Properties>
<System  systemId="080046020118F805"
systemKind="PDW-1500 ver.1.400"/>
        <Attached mediaId="48E20300333405C1F805080046020118"
mediaKind="ProfessionalDisc"/>
        <Metadata type="text/xml; charset=utf-8">
<dm:DiscMeta
xmlns:dm="urn:schemas-professionalDisc:discMeta">
<dm:ProavIdRef
value="48E20300333405C1F805080046020118"/>
                        <dm:InitializedDate
value="2004-10-01T12:34:56+09:00"/>
</dm:DiscMeta>
</Metadata>
</Properties>
```
~ B12

```
<Contents>
```

<Material uri="/Clip/C0001.MXF" title="sampleClip1" type="MXF" videoType="IMX50" audioType="LPCM16" fps="59.94i" dur="399" ch="8" aspectRatio="4:3" offset="0" umid="060A2B3401010105010D431300000038E303003334059708004602 0118F805">
  <Proxy uri="/Sub/C0001S01.MXF" type="MXF" videoType="PD_Proxy_Video" audioType="A-Law" umid="060A2B3401010105010D4313FF000038E30300333405970800460 20118F805"/>
  <RelevantInfo uri="/Clip/C0001M01.XML" type="XML"/>
</Material>
~ B13

<Material uri="/Clip/C0002.MXF" type="MXF" videoType="IMX50" audioType="LPCM16 NonLPCM16" fps="59.94i" dur="298" ch="8" aspectRatio="4:3" offset="0" umid="060A2B3401010105010D431300000036E50300333405970800460201 18F805">
  <Proxy uri="/Sub/C0002S01.MXF" type="MXF" videoType="PD_Proxy_Video" audioType="A-Law" umid="060A2B3401010105010D4313FF000036E50300333405970800460 20118F805"/>
  <RelevantInfo uri="/Clip/C0002M01.XML" type="XML"/>
</Material>
~ B14

<Material uri="/Edit/E0001E01.SMI" title="sampleClipList1" type="PD-EDL" fps="59.94i" dur="298" ch="8" aspectRatio="4:3" umid="060A2B3401010105010D431300000005EE80300333405970800460 20118F805">
  <RelevantInfo uri="/Edit/E0001M01.XML" type="XML"/>
</Material>
~ B15

```
</Contents>
</MediaProfile>
```

\* The contents of DiscMeta in the Metadata element shall describe the contents of DiscMeta in Disc.

SERVER APPARATUS, DATA PROCESSING METHOD, PROGRAM, AND COMMUNICATION METHOD

CROSS REFERENCES TO RELATED APPLICATIONS

The present invention contains subject matter related to Japanese Patent Application JP 2005-313126 filed in the Japanese Patent Office on Oct. 27, 2005, the entire contents of which are incorporated herein by reference.

BACKGROUND OF THE INVENTION

1. Field of the Invention

The present invention relates to a server apparatus, a data processing method, a program, and a communication method for identifying content data both locally and globally.

2. Description of the Related Art

It has been difficult for applications using audio-visual (AV) material stored in a storage device, such as a non-linear editing application, to quickly and easily determine what AV material is recorded on the storage device and what is the most desired AV material.

When AV material is stored and managed in the form of files in the storage device, a command such as LIST is issued to obtain a list of files stored in the storage device if it uses a standard file system.

However, it is difficult to distinguish AV material, metadata (e.g., extensible markup language (XML) documents), and other data from each other, and those files are recognized as an identical file that stores some binary data.

The application on the file system is implemented by an AV-material database application that can manage the relationship between AV material files, metadata files, and other data files while distinguishing those files from each other. The implementation of such an application is mainly achieved by management data (in the form of files or in the form of an expansion into an internal memory) describing a list of the AV material (files), metadata (files), and other data (files) managed by the application and the relationship therebetween. However, the management data is often specific to the database application, and it is not taken into consideration that external applications, such as the non-linear editing application described above, may use the management data.

A video editing technique of the related art is disclosed in Japanese Unexamined Patent Application Publication No. 2004-320756.

SUMMARY OF THE INVENTION

It is therefore desirable to provide a server apparatus, a data processing method, a program, and a communication method capable of managing content data locally within a predetermined server apparatus as well as globally outside the server apparatus.

According to a first embodiment of the present invention, a server apparatus for providing content data includes the following elements. Generating means generates second management data based on first management data, the first management data being used for managing first identification data for identifying the content data locally within the server apparatus, the second management data being used for managing second identification data for identifying the content data globally outside the server apparatus. Output means outputs the generated second management data generated by the generating means to an external apparatus that uses the content data.

According to a second embodiment of the present invention, a data processing method performed by a server apparatus for providing content data includes the steps of generating second management data based on first management data, the first management data being used for managing first identification data for identifying the content data within the server apparatus, the second management data being used for managing second identification data for identifying the content data globally outside the server apparatus; and outputting the generated second management data to an external apparatus that uses the content data.

According to a third embodiment of the present invention, a program executed by a server apparatus for providing content data causes the server apparatus to execute the steps of generating second management data based on first management data, the first management data being used for managing first identification data for identifying the content data within the server apparatus, the second management data being used for managing second identification data for identifying the content data globally outside the server apparatus; and outputting the generated second management data to an external apparatus that uses the content data.

According to a fourth embodiment of the present invention, a communication method for transmitting content data from a server apparatus to a client apparatus includes the steps of generating, by the server apparatus, second management data based on first management data, the first management data being used for managing first identification data for identifying the content data within the server apparatus, the second management data being used for managing second identification data for identifying the content data globally outside the server apparatus; transmitting, by the server apparatus, the generated second management data to the client apparatus; receiving, by the client apparatus, the second management data from the server apparatus; determining, by the client apparatus, desired content data based on the received second management data; and receiving, by the client apparatus, the desired content from the server apparatus.

According to the embodiments of the present invention, a server apparatus, a data processing method, a program, and a communication method capable of managing content data locally within a predetermined server apparatus as well as globally outside the server apparatus can be achieved.

BRIEF DESCRIPTION OF THE DRAWINGS

FIG. 3 is a diagram showing an example of index file data IND;

FIG. 4 is a diagram further showing the example of the index file data IND shown in FIG. 3;

FIG. 5 is a diagram further showing the example of the index file data IND shown in FIG. 4;

FIG. 6 is a diagram showing an example of media profile data MP;

FIG. 7 is a diagram further showing the example of the media profile data MP shown in FIG. 6;

DESCRIPTION OF THE PREFERRED EMBODIMENTS

A communication system according to an embodiment of the present invention will be described.

Figure 1:
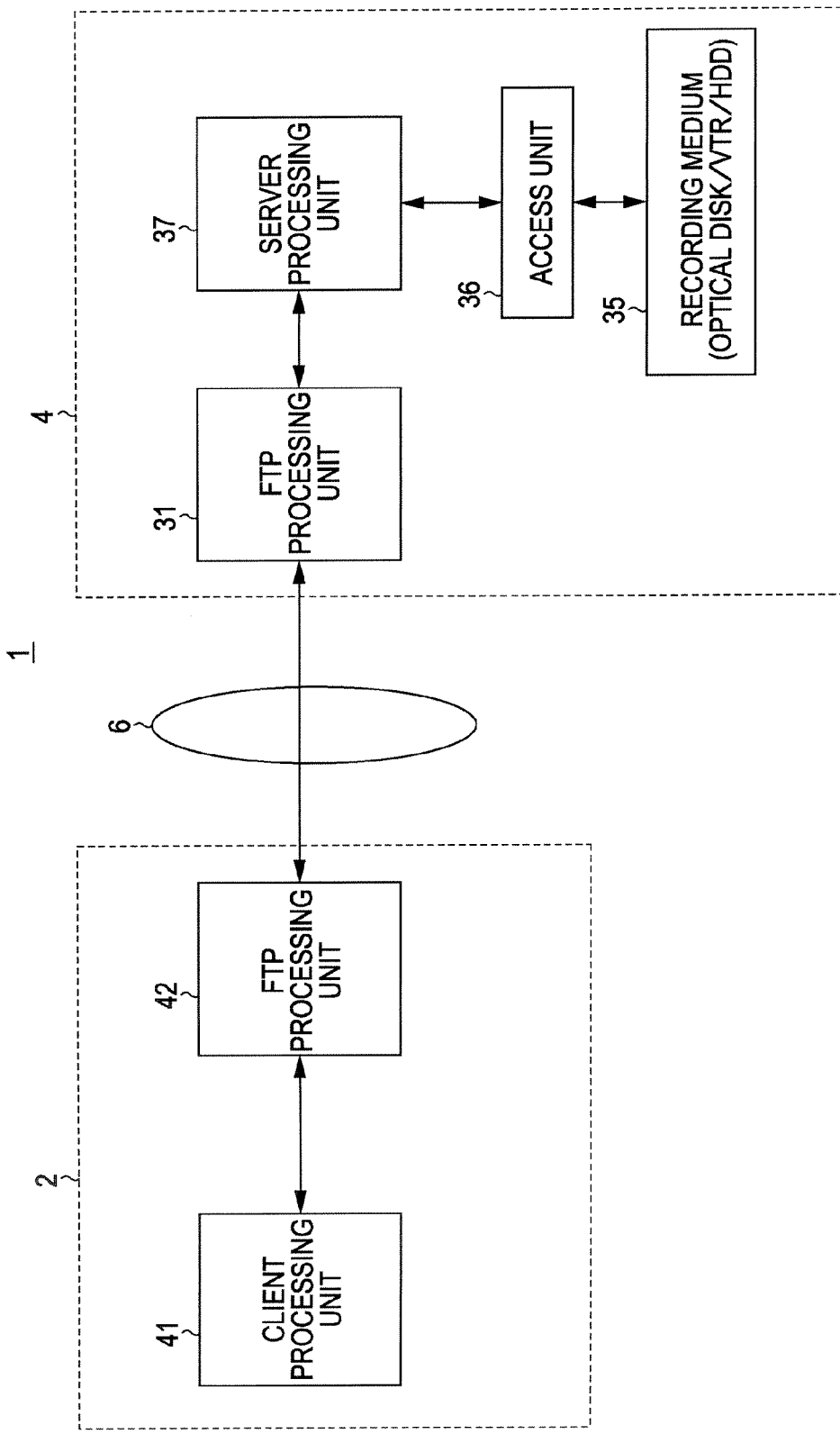
FIG. 1 is a diagram showing the overall structure of a communication system according to an embodiment of the present invention.

Referring to FIG. 1, a client apparatus 2 is an example of an external apparatus according to an embodiment of the present invention, and a server apparatus 4 is an example of a server apparatus according to an embodiment of the present invention.

Figure 2:
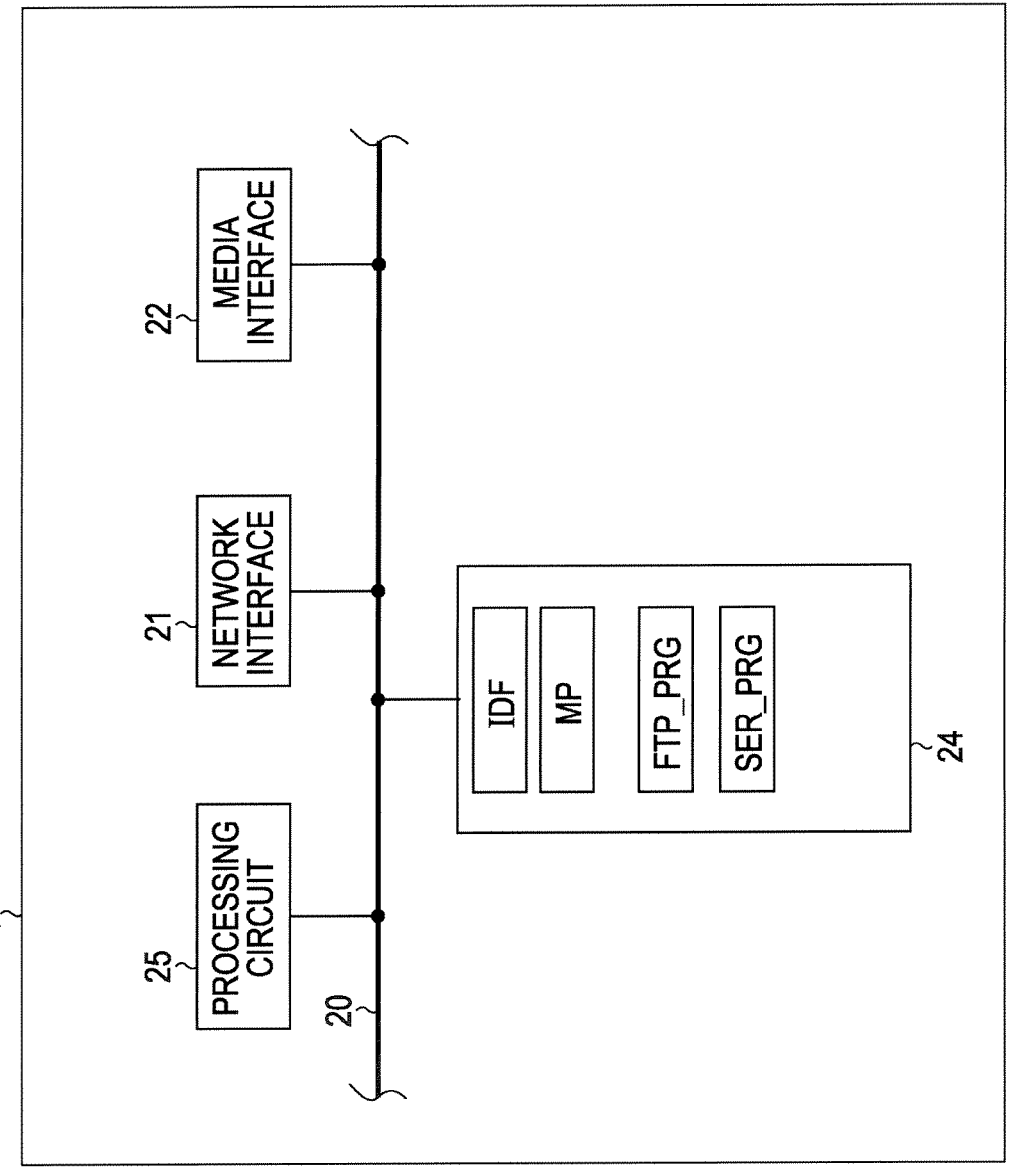
FIG. 2 is a diagram showing a hardware configuration for implementing an FTP processing unit and a server processing unit of a server apparatus shown in FIG. 1.

A server processing unit 37 shown in FIG. 1 and a processing circuit 25 shown in FIG. 2 serve as generating means according to an embodiment of the present invention, and a file transfer protocol (FTP) processing unit 31 and the processing circuit 25 serve as output means according to an embodiment of the present invention.

The server processing unit 37 and the processing circuit 25 realize the function of processing means and modifying means according to an embodiment of the present invention.

A modified UMID (Unique Material Identifier) of the embodiment is an example of first identification data according to an embodiment of the present invention, and a UMID of the embodiment is an example of second identification data according to an embodiment of the present invention.

Index file data IND of the embodiment is an example of first management data according to an embodiment of the present invention, and media profile data MP of the embodiment is an example of second management data according to an embodiment of the present invention.

Programs FTP_PRG and SER_PRG shown in FIG. 2 are examples of a program according to an embodiment of the present invention.

Overview of the Embodiment

Figure 11:
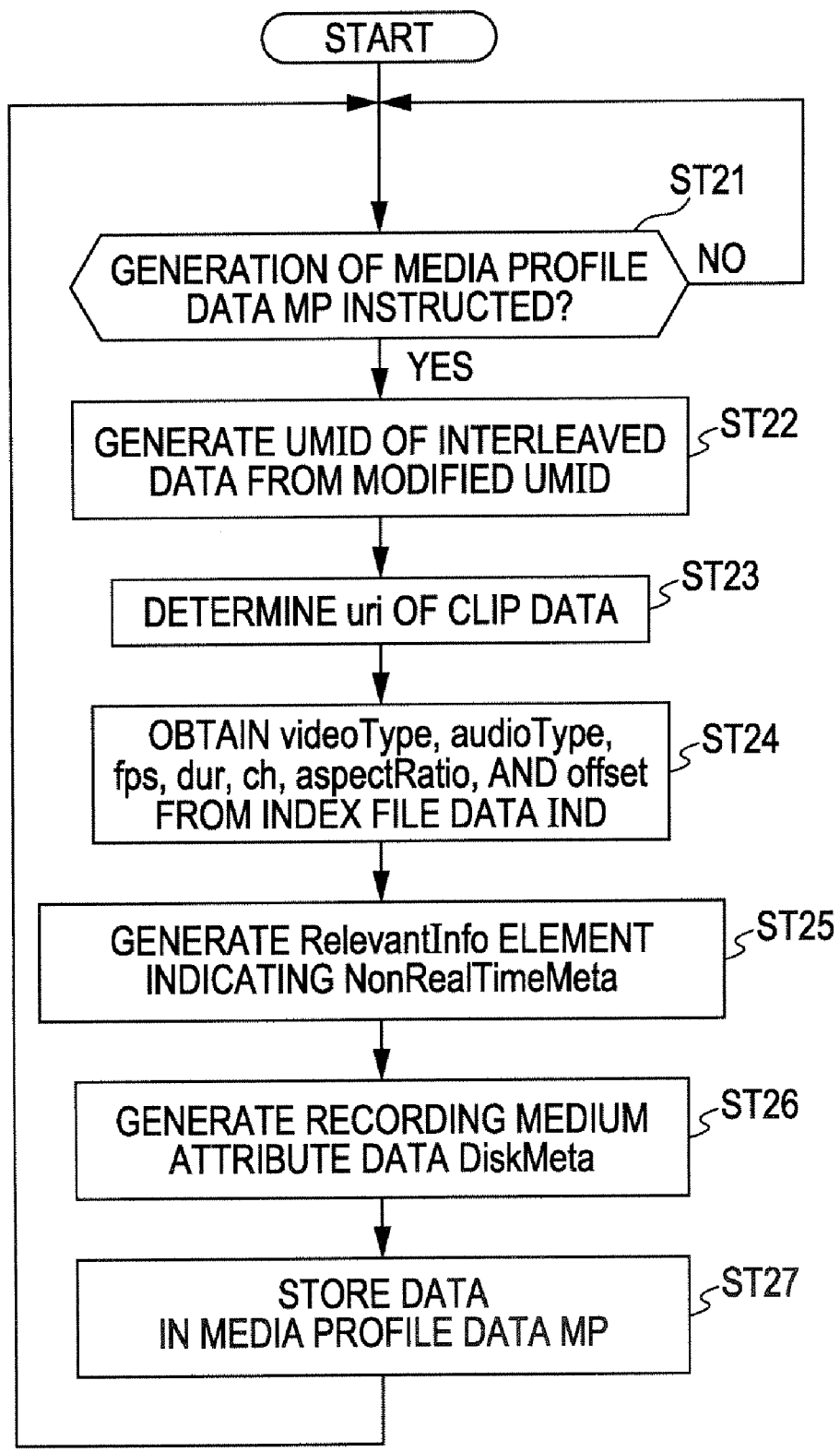
FIG. 11 is a flowchart showing in detail the processing of step ST13 shown in FIG. 10 in which the media profile data MP is generated.

Referring to FIG. 11 in a communication system 1 according to an embodiment of the present invention, video data and audio data recorded on a recording medium 35 and clip data obtained by interleaving the video data and the audio data are managed by the server apparatus 4 on the basis of index file data IND. The index file data IND manages various data on the basis of a modified UMID that is unique within the server apparatus 4.

The server apparatus 4 interleaves the video data and audio data read from the recording medium 35 to generate clip data, and transmits the clip data to the client apparatus 2.

The server apparatus 4 further generates media profile data MP based on the index file data IND, and transmits the media profile data MP to the client apparatus 2. The media profile data MP uses a UMID for globally identifying the clip data.

Accordingly, various data can be managed using modified UMIDs within the server apparatus 4 and using UMIDs outside the server apparatus 4.

Details of the Embodiment

FIG. 1 is a diagram showing the overall structure of the communication system 1 according to the embodiment of the present invention.

As shown in FIG. 1, for example, the communication system 1 includes the client apparatus 2 and the server apparatus 4, and the client apparatus 2 and the server apparatus 4 communicate with each other via a network 6.

In the embodiment, a plurality of client apparatuses 2 may be provided. The network 6 is a local area network (LAN), the Internet, or the like.

The client apparatus 2 may be an editing apparatus such as a computer, and the server apparatus 4 may be a camcorder.

As shown in FIG. 1, for example, the client apparatus 2 includes a client processing unit 41 and an FTP processing unit 42.

The function of the client processing unit 41 and the FTP processing unit 42 is realized by executing a predetermined program by means of a central processing unit (CPU) that is a hardware component of the client apparatus 2.

The client processing unit 41 controls the overall operation of the client apparatus 2 to perform processing such as interpreting an operation signal corresponding to an operation of an operation unit (not shown) by a user to issue an FTP command for the server apparatus 4 to the FTP processing unit 42, and displaying data input from the FTP processing unit 42 on a screen.

The FTP processing unit 42 transfers a file to and from the FTP processing unit 31 of the server apparatus 4 using FTP (File Transfer Protocol).

The client processing unit 41 receives, for example, clip data that is input from the server apparatus 4, and separates and plays back AV material data (video data and audio data) that is serialized in the clip data. The client processing unit 41 further edits the played back AV material data, and transmits the edited clip data to the server apparatus 4.

In the embodiment, as described below, the client apparatus 2 receives media profile data MP by using the function of the FTP processing unit 42. The media profile data MP is data for managing a plurality of pieces of clip data stored in the server apparatus 4 using UMIDs for globally identifying the plurality of pieces of clip data.

The client processing unit 41 of the client apparatus 2 sends a request for content data to the server apparatus 4 and manages the content data received from the server apparatus 4 on the basis of the media profile data MP.

The client apparatus 2 further displays a list of pieces of content data stored in the server apparatus 4 on the basis of the media profile data MP.

The client apparatus 2 further performs processing such as transmitting the clip data received from the server apparatus 4 via FTP communication to other apparatuses or recording the clip data onto a recording medium using a UMID of the clip data that is defined by the index file data IND.

As shown in FIG. 1, for example, the server apparatus 4 includes the FTP processing unit 31, the recording medium 35, an access unit 36, and the server processing unit 37.

The FTP processing unit 31 transfers a file to and from the FTP processing unit 42 of the client apparatus 2 using FTP.

The recording medium 35 stores video data captured by an image capturing unit (not shown) of the server apparatus 4 and audio data input from a microphone.

The recording medium 35 may be an optical disc, a video tape, a hard disk, or the like.

The access unit 36 accesses the recording medium 35 according to an instruction given from the server processing unit 37 to read or write the data recorded on the recording medium 35.

The server processing unit 37 controls the overall operation of the server apparatus 4.

The server processing unit 37 writes the video data captured by the image capturing unit (not shown) and the audio data input from the microphone onto the recording medium 35 through the access unit 36. The server processing unit 37 may write video data and audio data received from another apparatus onto the recording medium 35 through the access unit 36.

The server processing unit 37 further writes edited video data and audio data that are received through the FTP processing unit 31 onto the recording medium 35 through the access unit 36.

The server processing unit 37 further reads the video data and audio data stored in the recording medium 35 through the access unit 36 in response to a request input from the client apparatus 2 through the FTP processing unit 31, and serializes the read video data and audio data to generate AV material data. The server processing unit 37 transfers the generated AV material data in the form of files to the client apparatus 2 through the FTP processing unit 31.

FIG. 2 is a diagram showing a hardware configuration for implementing the FTP processing unit 31 and the server processing unit 37 of the server apparatus 4 shown in FIG. 1.

As shown in FIG. 2, for example, the server apparatus 4 includes a network interface 21, a media interface 22, a memory 24, and a processing circuit 25.

The network interface 21 is an interface through which data and requests are input to and output from the client apparatus 2 via the network 6 shown in FIG. 1.

The media interface 22 is an interface through which data, such as AV data, to be read from or written to the recording medium 35 through the access unit 36 is input and output.

The memory 24 stores programs for implementing the operation of the processing circuit 25, and data used for the operation of the processing circuit 25.

Specifically, the memory 24 stores, for example, programs FTP_PRG and SER_PRG.

The memory 24 further stores, for example, index file data IND and media profile data MP.

The index file data IND is attribute data that is used by the server apparatus 4 to identify and manage the video data and audio data stored in the recording medium 35, as shown in FIGS. 3 to 5.

The media profile data MP is attribute data that is used by an apparatus located outside the server apparatus 4, such as the client apparatus 2, to identify and manage the video data and audio data stored in the recording medium 35, as shown in FIGS. 6 and 7.

The processing circuit 25 executes the program FTP_PRG to realize the function of the FTP processing unit 31 shown in FIG. 1.

The processing circuit 25 executes the program SER_PRG to realize the function of the server processing unit 37 shown in FIG. 1.

The processing circuit 25 generates the media profile data MP based on the index file data IND read by the server processing unit 37 from the memory 24 via a bus 20, and writes the media profile data MP onto the memory 24 via the bus 20.

FIGS. 3 to 5 are diagrams showing an example of the index file data IND.

The index file data IND is an XML document file for managing the AV material data stored in the recording medium 35 within the server apparatus 4. For the purpose of the management within the server apparatus 4, the index file data IND uses a modified UMID (material identification data unique within the apparatus), which is a modification of a UMID in which a fixed character string in the first 10 bytes of the UMID is omitted, and directly represents the internal directory structure of the recording medium 35. Thus, the structure involved with the processing of the modified UMID in the server apparatus 4 can be reduced in size.

UMID is a globally unique identifier of 32 bytes for managing AV material data defined in SMPTE 330M.

As shown in FIGS. 3 to 5, the index file data IND includes a block B1 that includes an attribute of the index file data IND, a block B2 that includes an attribute of a first clip, a block B3 that includes an attribute of a second clip, and a block B4 that includes an attribute of edited content.

The block B1 includes an XML namespace identifier defining the structure of the index file data IND, a (globally unique) identifier [proavId] of the recording medium 35, and an absolute path [clipTablepath] to the directory in which the video data and audio data forming the clip data is stored. An application having a driver capable of directly accessing the recording medium 35 on which clip data is recorded can use the absolute path to directly show video data and audio data of a clip stored in the recording medium 35 on the basis of a file name such as "/PROAV/CLPR/C0001V01.MXF".

In the embodiment, the term clip means AV material data obtained by performing a single image capturing operation or AV material data obtained by editing a clip to separate and combine pieces of clips.

In the embodiment, each clip includes video data of one channel and audio data of eight channels.

The block B2 includes a block C1 that includes an attribute of the overall first clip, a block C2 that includes an attribute of video data, blocks C3 to C10 that individually include attributes of audio data of eight channels, and a block C11 that includes an attribute of other data.

The block C1 includes a modified UMID [umid] of the first clip, a file name [file] of the first clip, a playback frame rate fps of AV material data of the first clip, a playback duration dur of the AV material data, the number of channels ch of the audio data, an angle of view aspectRatio, and an indication playable indicating whether or not the first clip can be played back.

The block C2 includes a modified UMID [umid], a file name [file], a file type [type], and a data length [header] of a file header of the video data of the first clip.

The blocks C3 to C10 include modified UMIDs [umid], file names [file], file types [type], and data lengths [header] of file headers of the first to eighth audio data of the first clip.

The block C11 includes a modified UMID [umid], a file name [file], a file type [type], and a header [header] of a sub-stream. The sub-stream is a low-resolution version of the clip (that is, a clip that has the same contents as the clip and that is generated at the same time as the clip with a higher compression ratio).

The block C11 further includes a file name [meta file] of data describing static information such as the title of the first clip, and a file type [type] of the data.

The block C11 further includes a file name [rtmeta file] of data describing dynamic information that varies frame-by-frame, such as the time code of the first clip, and a file type [type] of the data.

The block B3 includes an attribute of the second clip, and has a similar format to the block B2.

The block B4 includes edited list data indicating edited material obtained by editing, for example, the first and second clips.

FIGS. 6 and 7 are diagrams showing an example of the media profile data MP.

The media profile data MP is an XML document file for, outside the server apparatus 4, managing the AV material data stored in the recording medium 35.

For the purpose of the management outside the server apparatus 4, the media profile data MP uses a true UMID, as described above (rather than a modified UMID).

As shown in FIGS. 6 and 7, the media profile data MP includes blocks B11 to B15.

The block B11 includes an attribute of the overall media profile data MP.

The block B12 includes a Properties element indicating an attribute of a device (a storage device; in the embodiment, the server apparatus 4) that has generated the media profile data MP and the recording medium 35 placed in the device.

The blocks B13 to B15 includes a Contents element indicating a list of pieces of material stored in the storage device. If no material is stored, the Contents element is not generated.

The blocks B11 to B15 will be described in more detail.

The block B11 includes a statement <?xml version= . . . > stating an XML document, a highest-level element <MediaProfile xmlns . . . >, and attributes "createdAt= . . . " and "version= . . . " of the highest-level element.

The attribute "createdAt= . . . " indicates the date and time at which the media profile data MP was created. The attribute "version= . . . " indicates the schema version of the media profile data MP.

The block B12 includes a description "System" of a target storage device, a network node number "systemId" written in hexadecimal notation indicating a unique identifier of the target storage device, and a kind "systemKind" of the target storage device. Those are examples of device attribute data according to an embodiment of the present invention.

"systemKind" is followed by "Attached". "Attached" defines a description of a recording medium that is placed in the target storage device and that the description of the media profile data MP is based on if the target storage device has a removable recording medium. Unless specifically stated otherwise, one recording medium is associated with a description of one piece of media profile data MP. If the target storage device has no removable recording medium, the element "Attached" is not generated.

"mediaId" indicates a description of the identifier of the recording medium. A combination of "mediaId" and "mediaKind" subsequent to "mediaId" is used to uniquely identify the recording medium.

"dm" is an abbreviation of the XML namespace identifier of recording medium attribute data DiscMeta, and is to be added as a prefix to the top of an element name constituting a DiscMeta description. The recording medium attribute data DiscMeta describes an attribute of the recording medium 35 that is defined under Professional Disc (which is a trademark of Sony Corporation, indicating a recording format of business-use optical discs using a blue-violet laser and such an optical disc), such as a title of a disc. This is an example of recording medium attribute data according to an embodiment of the present invention.

The blocks B13 to B15 includes a Material element.

Figure 8:
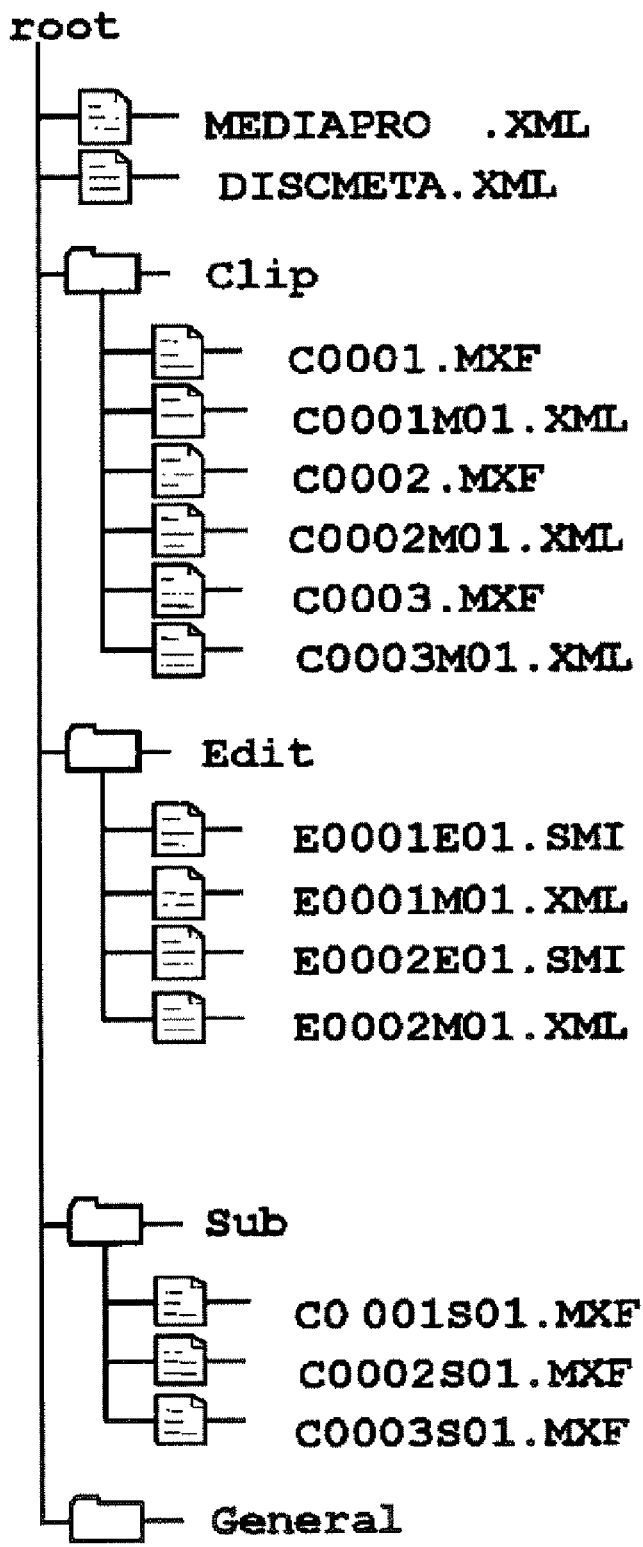
FIG. 8 is a diagram showing a directory structure of various data displayed on the client apparatus on the basis of the media profile data.

The Material element is described as a sub-element of the Contents element. The Material element includes attributes below. All the attributes, except for videoType, audioType, and aspectRatio, may be essential.

uri attribute: the uri attribute has as an attribute value an absolute URL capable of accessing the main line of the target clip and EditList (edited list data) in the FTP/FAM connection process. For example, as shown in FIG. 8, "uri= . . . " indicates the position on the directory hierarchy at which the corresponding clip resides, which can be viewed from outside the server apparatus 4. Specifically, 'uri="/Clip/Cxxxx.MXF"' (for the clip) or 'uri="/Edit/ExxxxE01.SMI"' (for the EditList) is described. If the clip or EditList is assigned an alias, the uri attribute describes the URL of the alias. In the embodiment, the uri attribute is used to designate a directory hierarchy position of the data (file) specified by the uri attribute, which can be viewed from outside the server apparatus 4. That is, the description of the media profile data MP by the server apparatus 4 can define the form in which the hierarchical structure of the data (such as clip data and edited data) stored in the server apparatus 4 is viewed from outside.

Figure 9:
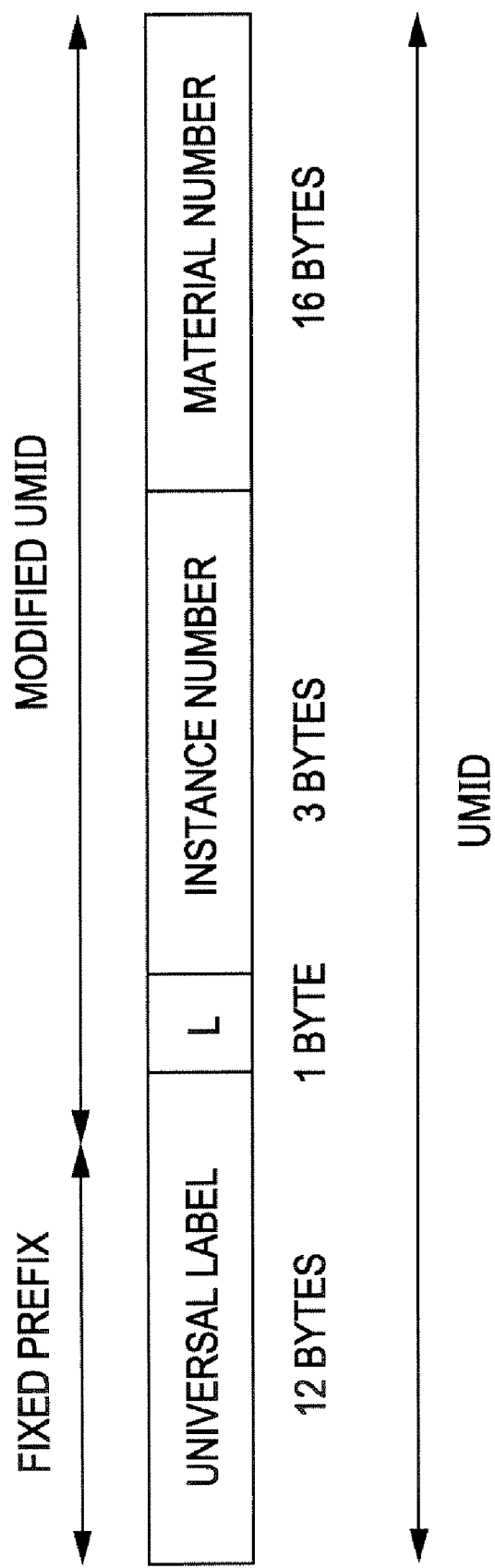
FIG. 9 is a diagram showing the relationship between a modified UMID and a UMID.

Title attribute: this attribute has a character string for identifying material (clip or EditList).

type attribute: this attribute describes "MXF" for AV material (clip) and "PD-EDL" for EditList.

videoType attribute: this attribute has an attribute value directly describing the values of the clip element, the video element, and the type attribute of the target clip in the index file data IND. The videoType attribute is not described in the Material element representing the EditList.

audioType attribute: this attribute has an attribute value describing the values of the clip element, the audio element, and the type attribute of the target clip in the index file data IND for each of the channels.

fps attribute: this attribute has an attribute value directly describing the values of the clip element and the fps attribute of the target clip or the values of the editlist element and the fps attribute of the target EditList in the index file data IND.

dur attribute: this attribute has an attribute value directly describing the values of the clip element and the dur attribute of the target clip or the values of the editlist element and the dur attribute of the target EditList in the index file data IND.

ch attribute: this attribute has an attribute value directly describing the values of the clip element and the ch attribute of the target clip or the values of the editlist element and the ch attribute of the target EditList in the index file data IND.

aspectRatio attribute: this attribute has an attribute value directly describing the values of the clip element and the aspectRatio attribute of the target clip or the values of the editlist element and the aspectRatio attribute of the target EditList in the index file data IND. If the index file data IND does not include an aspectRatio attribute, this attribute is omitted.

offset attribute: this attribute has an attribute value directly describing the values of the clip element, the video element, and the clipBegin attribute of the target clip in the index file data IND. The offset attribute is not described in the Material element representing the EditList.

umid attribute: this attribute has an attribute value describing a UMID, as shown in FIG. 9, in which a prefix ("060A2B34010101050101") in the first 10 bytes of the UMID is attached to the top of the values of the clip element and the umid attribute of the target clip in the index file data IND. In the embodiment, as described above, due to saving in file length, the modified UMID in the index file data IND is described in the form in which the fixed prefix in the first 10 bytes of the UMID is omitted.

The Material element has one Proxy element and one RelevantInfo element as sub-elements. The Proxy element manages a proxy that is a piece of low-resolution material corresponding to the clip, and the RelevantInfo element manages a NonRealTimeMeta file describing static information of the clip, such as the title of the clip. The details of those elements are as follows:

The Proxy element represents information regarding the proxy. In the server apparatus 4 (XDCAM), the Proxy element appears as a sub-element of the Material element corresponding to the clip, but does not appear as a sub-element of the Material element corresponding to the EditList. The Proxy element is an empty element, and has the following attributes:

uri attribute: the uri attribute has as an attribute value an absolute URL capable of accessing the proxy of the target clip in the FTP/FAM connection process.

type attribute: the proxy handled by the server apparatus 4 is an MXF file (OP1a), and the type attribute has an attribute value describing "MXF".

videoType attribute: the video codec of the proxy handled by the server apparatus 4 is defined in the PD File Format specification, and the videoType attribute has an attribute value describing "PD_Proxy_Video" indicating the format.

audioType attribute: the audio codec of the proxy handled by the server apparatus 4 is defined as A-law in the PD File Format specification, and the audioType attribute has an attribute value describing "A-Law".

umid attribute: this attribute has an attribute value describing a global UMID in which a prefix ("060A2B34010101050101") in the first 10 bytes of the UMID is attached to the top of the values of the clip element, the substream element, and the umid attribute of the target clip in the index file data IND.

The RelevantInfo element represents information regarding NonRealTimeMeta. In the server apparatus 4, the RelevantInfo element appears as a sub-element of the Material element. In the embodiment, NonRealTimeMeta specifically indicates data describing static information such as a title of a clip. "RelevantInfo" is a description regarding metadata other than the proxy AV material associated with the material data. The RelevantInfo element is an empty element, and has the following attributes:

uri attribute: the uri attribute has as an attribute value an absolute URL capable of accessing the NonRealTimeMeta of the target clip and EditList in the FTP/FAM connection process. Specifically, 'uri="/Clip/CxxxxM01.XML"' or 'uri="/Edit/ExxxxM01.XML"' is described.

type attribute: the NonRealTimeMeta file is an XML document, and the type attribute has an attribute value describing "XML".

The operation of the communication system 1 will be described in the context of the operation of the server apparatus 4.

An operation of the server apparatus 4 for generating the media profile data MP will be described.

Figure 10:
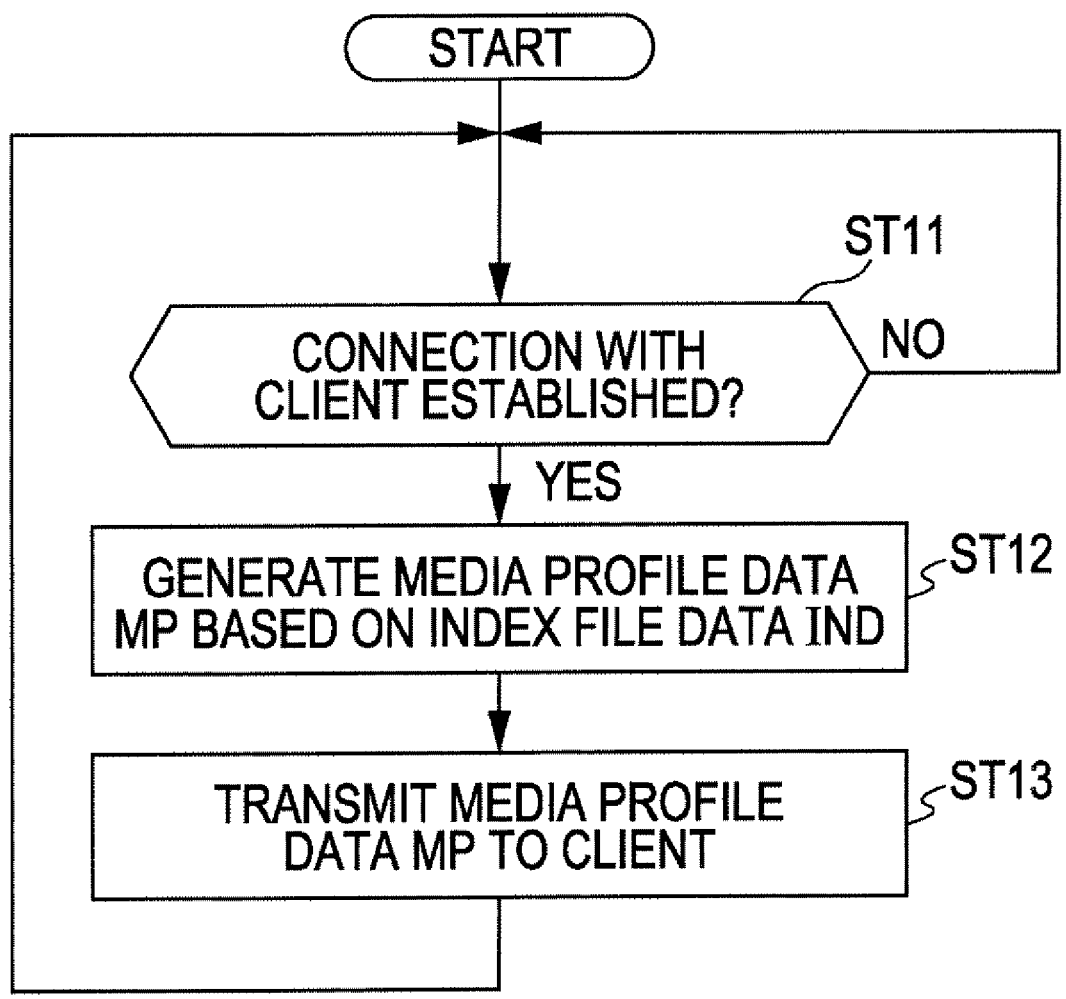
FIG. 10 is a flowchart showing an operation of the server apparatus shown in FIG. 1 for generating the media profile data MP.

FIG. 10 is a flowchart showing a first example of the operation.

In step ST11, the server processing unit 37 of the server apparatus 4 shown in FIG. 2 determines whether or not a connection with the client apparatus 2 has been established via the network 6. If it is determined that the connection has been established, the process proceeds to step ST12.

In step ST12, the server processing unit 37 of the server apparatus 4 reads the index file data IND from the memory 24 shown in FIG. 2, and generates the media profile data MP based on the read index file data IND.

The processing of step ST12 will be described in detail with reference to a second example of the operation.

In step ST13, the server processing unit 37 of the server apparatus 4 transmits the media profile data MP generated in step ST12 to the client apparatus 2 through the FTP processing unit 31 via FTP communication.

The client apparatus 2 displays a directory storing clip data (Clip), edited list data (Edit), and low-resolution clip data (Sub), which are stored in the recording medium 35, on the basis of the media profile data MP received from the server apparatus 4, for example, using the uri attribute ("uri=") in the media profile data MP in the manner shown in FIG. 8 according to the public format designated by the server apparatus 4.

Further, the client apparatus 2 globally identifies and manages the interleaved data (clip data) received from the server apparatus 4 via FTP using the UMID.

The processing of step ST12 shown in FIG. 10 in which the media profile data MP is generated will be described in detail.

FIG. 11 is a flowchart showing a second example of the operation.

If it is determined whether the connection has been established in step ST11 shown in FIG. 10, that is, if the server processing unit 37 of the server apparatus 4 receives an instruction to generate the media profile data MP in step ST21, the process proceeds to step ST22.

In step ST22, the server processing unit 37 of the server apparatus 4 generates a UMID of 32 bytes by reading the index file data IND from the memory 24 shown in FIG. 2, reading the modified UMID of each of the clips in the index file data IND, and adding a predetermined prefix in the first 10 bytes of the UMID (which is a fixed character string indicating a UMID) to the read modified UMID.

In step ST23, the server processing unit 37 of the server apparatus 4 determines "uri" of the clip data (interleaved data). "uri" indicates an absolute address capable of accessing the main line of the target clip and the edited list data (EditList) from outside the server apparatus 4.

In step ST24, the server processing unit 37 of the server apparatus 4 obtains the videoType, audioType, fps, dur, ch, aspectRatio, and offset attributes from the index file data IND.

In step ST25, the server processing unit 37 of the server apparatus 4 generates a RelevantInfo element indicating metadata, such as NonRealTimeMeta, other than the proxy AV material associated with the material.

In step ST26, the server processing unit 37 of the server apparatus 4 reads the recording medium attribute data DiscMeta from the recording medium 35.

In the embodiment, the recording medium attribute data DiscMeta describes static information regarding a disc, such as the title of the disc or the date and time of the initialization of the disc.

In step ST27, the server processing unit 37 of the server apparatus 4 generates media profile data MP storing the data obtained and generated in steps ST22 to ST26 and other data shown in FIGS. 6 and 7.

An operation of the server apparatus 4 upon receiving a clip request from the client apparatus 2 will be described.

Figure 12:
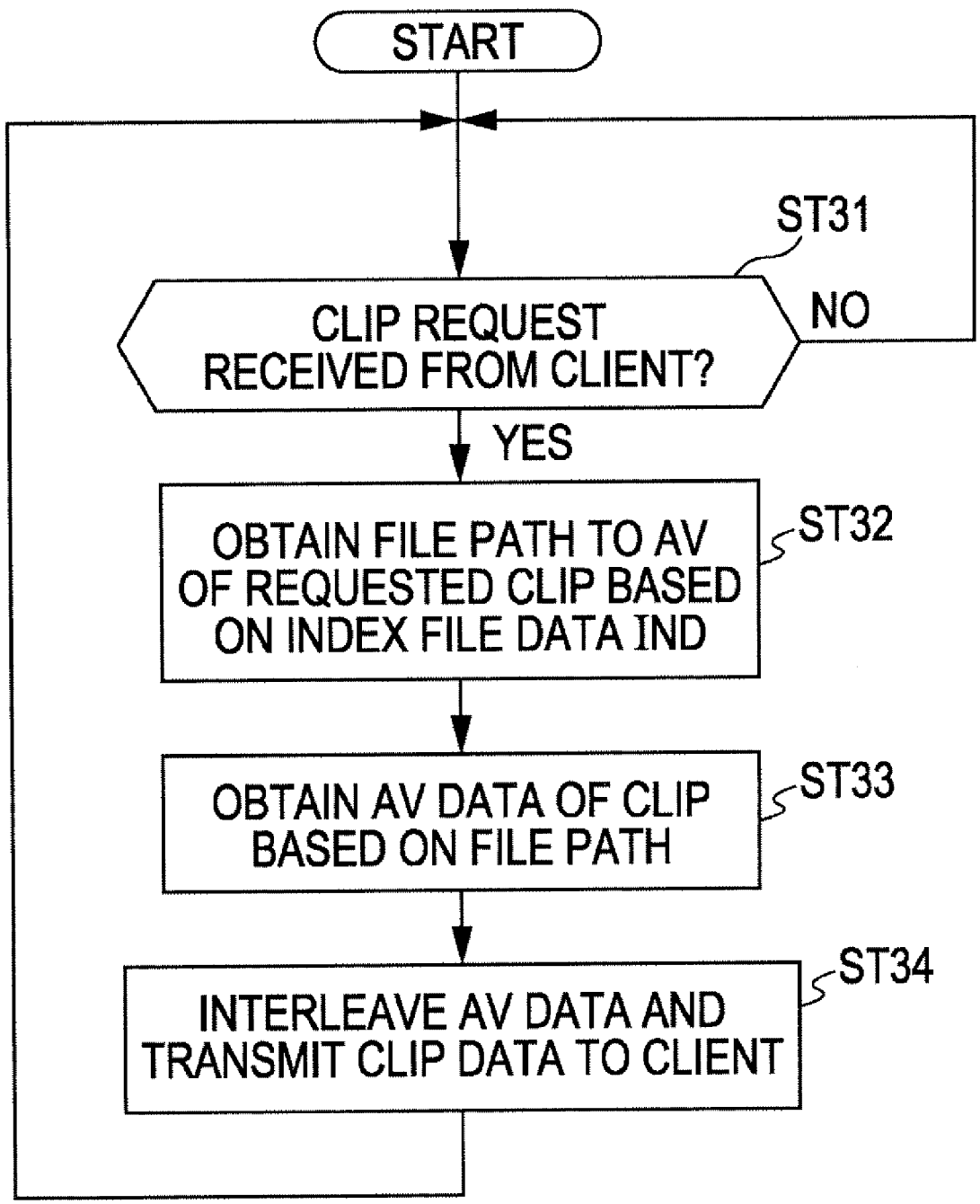
FIG. 12 is a flowchart showing an operation of the server apparatus shown in FIG. 1 upon receiving a clip request from the client apparatus.

FIG. 12 is a flowchart showing a third example of the operation.

In step ST31, the server processing unit 37 of the server apparatus 4 shown in FIG. 2 determines whether or not the FTP processing unit 31 has received a clip request from the client apparatus 2 via FTP communication.

The clip request includes, for example, the UMID of the requested clip.

In step ST32, the server processing unit 37 of the server apparatus 4 obtains the modified UMID that follows the first 10 bytes of the UMID included in the clip received in step ST31.

Then, the server processing unit 37 obtains file paths to a piece of video data and eight piece of audio data associated with the clip request on the basis of the obtained modified UMID and the index file data IND.

In step ST33, the server processing unit 37 of the server apparatus 4 uses the file paths obtained in step ST32 to read the piece of video data and the eight pieces of audio data associated with the clip request from the recording medium 35.

In step ST34, the server processing unit 37 of the server apparatus 4 interleaves the piece of video data and the eight pieces of audio data read in step ST33 to generate clip data.

Then, the server processing unit 37 transmits the clip data to the client apparatus 2 via the network interface 21 shown in FIG. 2 by using the FTP function of the FTP processing unit 31.

The client apparatus 2 obtains the clip data from the server apparatus 4 by using the function of the FTP processing unit 42, and performs processing such as playing back the clip data by using the function of the client processing unit 41.

Figure 13:
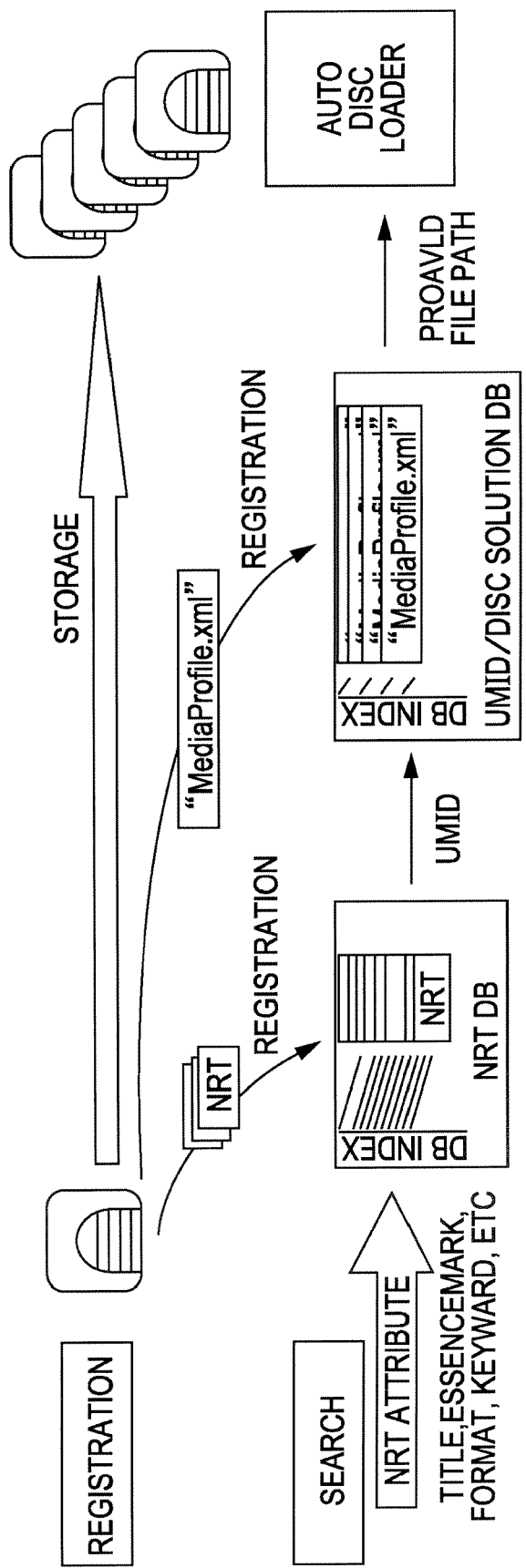
FIG. 13 is a diagram showing the relationship between a UMID and a file path.

A fourth example of the operation will be described with reference to FIG. 13.

In the communication system 1, for example, a UMID is used to refer to target material from NonRealTimeMeta (NRT) or edited list data. As shown in FIG. 13, a UMID is obtained from an NRT database on the basis of the NRT attribute, and a unique identifier ProavId of a recording medium on which the target file is recorded is obtained using a UMID/Disc solution database. Based on the media identifier ProavId, the server apparatus 4 accesses the file data in the recording medium 35.

As described above, in the communication system 1, the server apparatus 4 generates UMID-based media profile data MP based on modified-UMID-based index file data IND, and transmits the generated media profile data MP to the client apparatus 2.

Therefore, the server apparatus 4 can perform processing with a compact design using a modified UMID having a short bit length, and the client apparatus 2 can manage clip data, etc., using a UMID.

Further, in the communication system 1, the server apparatus 4 can designate a hierarchical structure in which clip data, edited list data, and low-resolution data reside, which can be viewed from outside the server apparatus 4, using the attribute "uri" in the media profile data MP. The data actually received by the client apparatus 2 from the server apparatus 4 can therefore be matched with the hierarchical structure and a file name, which can be viewed by the client apparatus 2.

Further, in the communication system 1, the server apparatus 4 can transmit the media profile data MP to the client apparatus 2, thereby notifying the client apparatus 2 of the attributes of the storage device (the server apparatus 4) that handles the data to be transmitted from the server apparatus 4 to the client apparatus 2 and the attributes of the recording medium 35.

Further, in the communication system 1, since the attribute information on a recording medium storing clip data and the attribute information on the server apparatus 4 are stored in the media profile data MP to be transmitted from the server apparatus 4 to the client apparatus 2, the client apparatus 2 can use the media profile data MP to play back and edit the clip data under appropriate conditions.

The present invention is not limited to the embodiment described above.

It is to be understood that those skilled in the art can make various changes, combinations, sub-combinations, and alterations to the features of the above-described embodiment without departing from the technical scope of the present invention or a scope equivalent thereto.

While an embodiment has been described with respect to FTP communication between the server apparatus 4 and the client apparatus 2, the access to data recorded on a disc through an appropriate driver via APIs of well-known file basic operations, such as open( ), read( ), write( ), and close( ), may also fall within the scope of the present invention.

While in the above-described embodiment, content data according to an embodiment of the present invention has been described in the context of video data, audio data, clip data, and the like, other data may be used instead.

It should be understood by those skilled in the art that various modifications, combinations, sub-combinations and alterations may occur depending on design requirements and other factors insofar as they are within the scope of the appended claims or the equivalents thereof.

What is claimed is:

1. A server apparatus for providing content data, the server apparatus comprising:
    generating means for generating second management data based on first management data, the first management data being used for managing first identification data for identifying the content data locally within the server apparatus, the second management data being used for managing second identification data for identifying the content data globally outside the server apparatus;
    output means for outputting the generated second management data generated by the generating means to an external apparatus that uses the content data;
    obtaining means for obtaining a plurality of pieces of content data; and
    modifying means for modifying the plurality of pieces of content data obtained by the obtaining means into a single piece of content data and outputting the single piece of content data to the external apparatus,
    wherein the second identification data managed by the second management data generated by the generating means globally identifies the single piece of content data output by the modifying means, the generating means generates the second identification data by performing predetermined processing on the first identification data when the plurality of pieces of content data are defined as elements of a clip and when the first identification data identifies the clip within the server apparatus, and the generating means generates the second identification data by adding a predetermined fixed value to the first identification data.

2. The server apparatus according to claim 1, wherein the obtaining means reads the plurality of pieces of content data from a recording medium on the basis of the first management data.

3. The server apparatus according to claim 1, wherein the second management data generated by the generating means further indicates predetermined directory information for releasing the content data to the external apparatus.

4. The server apparatus according to claim 1, wherein generation of the second management data by the generating means is triggered by an establishment of a connection between the external apparatus and the server apparatus.

5. The server apparatus according to claim 1, wherein when the obtaining means reads the plurality of pieces of content data from a recording medium that is set at a predetermined access position, generation of the second management data by the generating means is triggered by a change in the recording medium set at the access position or a change in data recorded on the recording medium.

6. The server apparatus according to claim 1, wherein when the obtaining means reads the plurality of pieces of content data from a recording medium, the second management data includes recording medium attribute data indicating an attribute of the recording medium, and material attribute data indicating an attribute including an addresses of the clip or edited data of the clip.

7. The server apparatus according to claim 6, wherein the material attribute data further includes an address of low-resolution data of the clip.

8. The server apparatus according to claim 6, wherein the material attribute data includes an address to data indicating an attribute of the clip.

9. The server apparatus according to claim 6, wherein when the recording medium is accessed by a storage device, the second management data further includes device attribute data indicating an attribute of the storage device.

10. The server apparatus according to claim 9, wherein the recording medium attribute data further indicates an attribute of a recording medium that is placed in the storage device and that stores the content data.

* * * * *